Nov. 26, 1935.  G. A. LYON  2,022,132
TIRE COVERING AND HOLDING DEVICE
Original Filed March 3, 1930  2 Sheets-Sheet 1
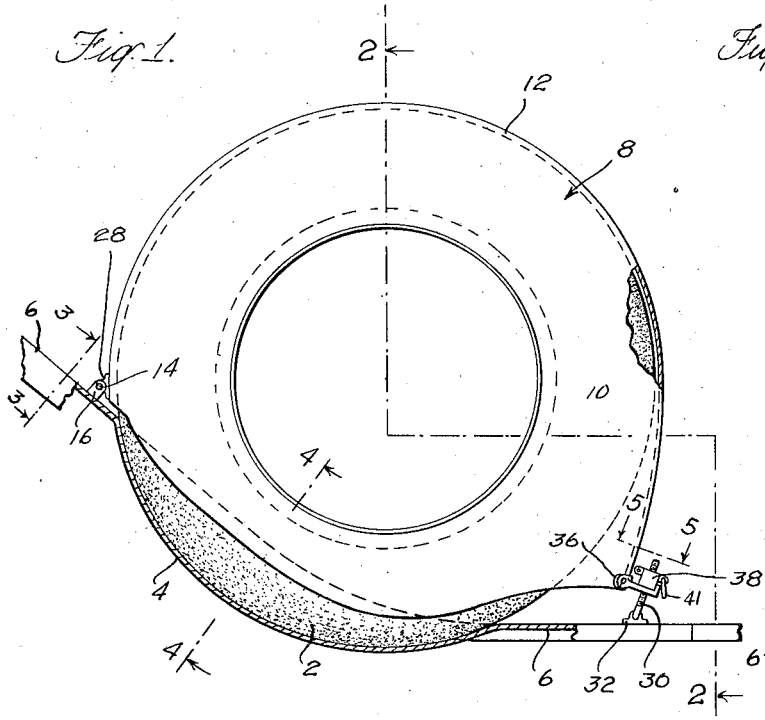
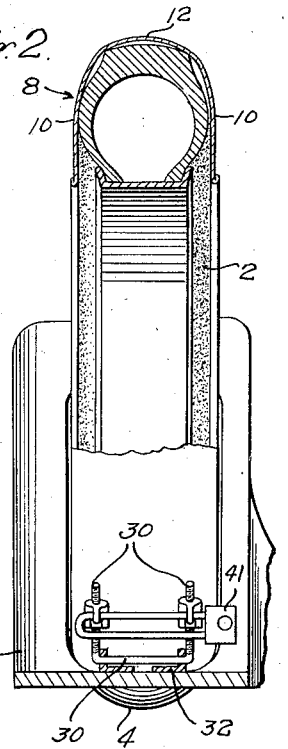
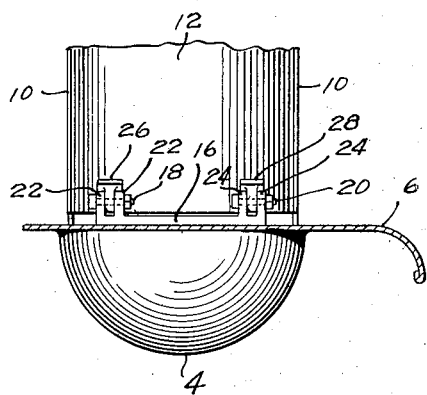
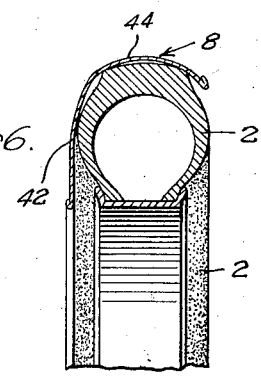
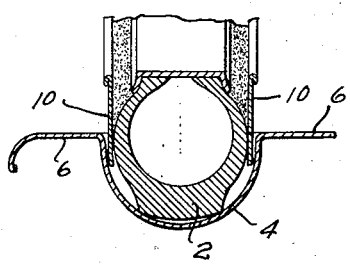
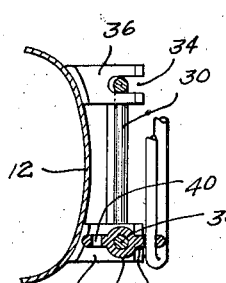
INVENTOR
GEORGE ALBERT LYON
BY
ATTORNEYS Nov. 26, 1935.  G. A. LYON  2,022,132
TIRE COVERING AND HOLDING DEVICE
Original Filed March 3, 1930  2 Sheets-Sheet 2
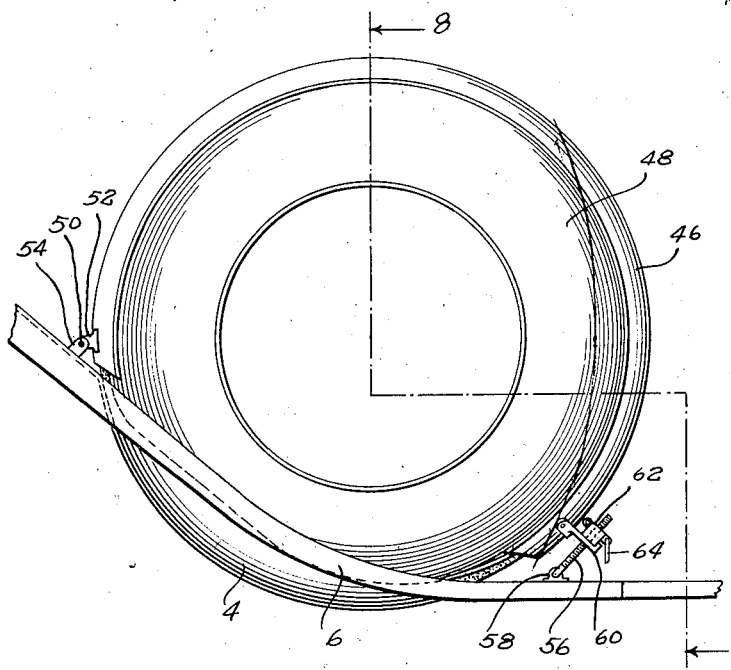
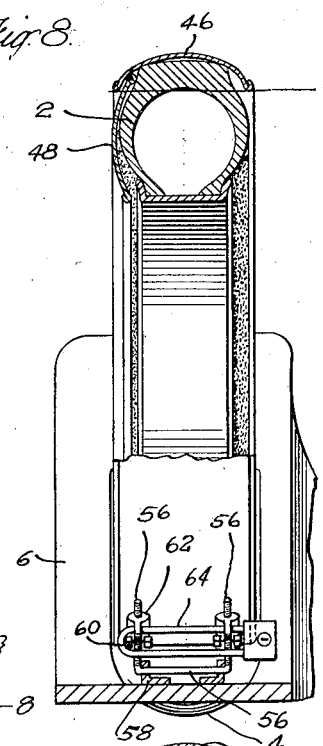
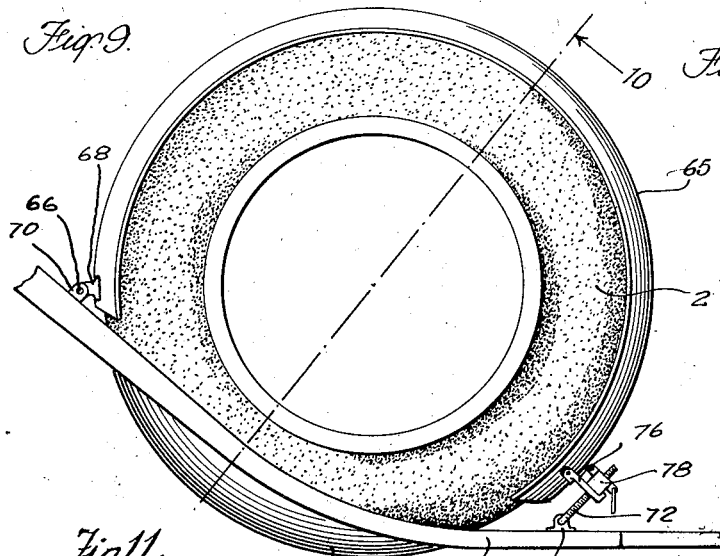
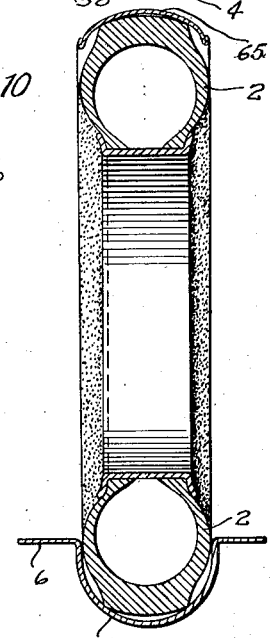
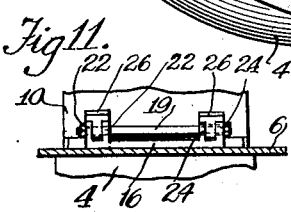
INVENTOR
GEORGE ALBERT LYON
BY
ATTORNEYS Patented Nov. 26, 1935

2,022,132

UNITED STATES PATENT OFFICE 2,022,132

TIRE COVERING AND HOLDING DEVICE

George Albert Lyon, Allenhurst, N. J., assignor to Lyon Incorporated, Asbury Park, N. J., a corporation of Delaware Application March 3, 1930, Serial No. 432,612
Renewed January 4, 1935

5 Claims. (Cl. 224—29)

REISSUED

This invention relates to tire covering and holding devices for the spare tires of automobiles.

The invention is particularly designed to be applied to a tire supported on the fender or running board of an automobile.

The principal object of the invention is to produce a device which will cover a spare tire supported on the fender or running board of an automobile and which will also hold the tire securely in position on the fender or running board.

With this and other objects in view, the invention consists of the novel and improved features, constructions and combinations of parts hereinafter described and pointed out in the claims, the advantages of which will be readily understood and appreciated by those skilled in the art.

The invention is illustrated as embodied in a structure for covering a tire resting in a well in the fender of an automobile and for holding the tire securely in place in the well.

The invention will be clearly understood from the accompanying drawings illustrating the invention in its preferred form and the following detailed description of the constructions therein shown.

In the drawings:

Fig. 1 is a view in side elevation illustrating a construction embodying the invention;

Fig. 2 is a sectional view taken substantially on the line 2—2 of Fig. 1;

Fig. 3 is a detailed sectional view taken substantially on the line 3—3 of Fig. 1;

Fig. 4 is a detailed sectional view taken substantially on the line 4—4 of Fig. 1;

Fig. 5 is a detailed sectional view taken substantially on the line 5—5 of Fig. 1;

Fig. 6 is a detailed sectional view taken on a plane substantially the same as the upper portion of Fig. 2 and illustrating a modified construction;

Fig. 7 is a view in side elevation illustrating a modified form of the invention;

Fig. 8 is a sectional view taken substantially on the line 8—8 of Fig. 7;

Fig. 9 is a view in side elevation illustrating a still further modified form of the invention;

Fig. 10 is a sectional view taken substantially on the line 10—10 of Fig. 9; and Fig. 11 shows a modification of the pivot structure of Fig. 3.

The invention is illustrated in this application as applied to a tire 2 engaging in a recess or well 4 in the fender 6 of an automobile. The structure illustrated serves the dual function of a "hold-down" device for holding the tire in the fender well and a cover for the tire.

In the construction shown in Figs. 1–5 inclusive the structure comprises a casing indicated at 8 of annular form for enclosing the portion of the tire extending above the fender well. This casing is made of relatively stiff sheet material and preferably consists of sheet metal shaped into the desired form. The casing 8, as shown, is annular in form and comprises side walls 10 for covering the opposite sides of the tire, and a peripheral wall 12 arranged to extend about the peripheral portion of the tire. The side walls 10 of the casing, as shown in the drawings, are terminated adjacent the rim. These side walls, however, may be constructed so as to extend to the axis of the tire and rim. The peripheral wall 12 of the casing is formed to extend partially about the tire in engagement with the tread, as shown in Fig. 1, and the ends of this wall are spaced apart a distance slightly greater than the diameter of the tire to enable the casing readily to be applied over a tire and removed therefrom. The side walls 10 are preferably shaped to extend for a short distance into the fender well, as shown in Figs. 1 and 4.

The casing 8 is arranged to extend over the tire and to engage the tread in the manner illustrated in Figs. 1 and 2 and is adapted to be secured in fixed position with relation to the fender so as to hold the tire securely in place in the fender well. The devices for holding the casing in position, however, may be arranged either so that the casing may be entirely detached from the fender or that it may be moved with relation to the fender to permit the removal of the tire.

In the construction shown, the casing 8 is pivoted at 14 upon a bracket 16 secured to the fender. The casing is preferably pivoted to the bracket 16 upon pivot bolts 18 and 20 passing respectively through projections 22 and 24 on the bracket 16 and through projections on brackets 26 and 28 secured to the casing. The sets of projections 22 and 24 and the brackets 26 and 28 are spaced apart a considerable distance in a direction transverse to the central plane of the casing thereby giving a spaced two-point support for the pivoted end of the casing, as shown in Fig. 3.

The opposite end of the casing 8 is adapted to be forced down toward the fender to force the tire firmly into the fender well to hold the tire in position. The devices for holding down this end of the casing are arranged so that the casing may be released and swung upwardly about the pivot 14.

The devices for holding down the latter end of the casing comprise a U-shaped shackle 30 pivoted in brackets 32 secured to the fender. The spaced parallel arms of this shackle are respectively arranged to engage in slots 34 in spaced brackets 36 secured to the casing 8. The said arms of the shackle are threaded to receive wing nuts 38 which are adapted to engage the brackets 36. The brackets 36 are preferably provided with upwardly extending projections at their outer ends to prevent the disengagement of the arms of the shackle 30 from the slots 34 when the nuts are screwed down. The tire is firmly secured in the fender well by screwing down the nuts 38 so that they exert a heavy pressure on the brackets 36.

Figs. 1 and 2 show the position of the parts when the tire is secured within the fender well by the combined tire cover and "hold-down" or "push-down" device. In removing the tire from the well, the nuts 38 are first unscrewed and the shackle 30 is swung to the right, Fig. 1, to disengage the arms thereof from the slots 34 and the brackets 36. The casing 8 may then be swung upwardly and to the left to its limiting position after which the tire may be readily removed from the fender well. In placing a tire within the well the casing is swung back to its limiting position, the tire is placed in the well, and the casing is then swung downwardly until its peripheral wall 12 engages the peripheral or tread portion of the tire. The shackle 30 is then swung to the left, Fig. 1, to engage the arms thereof in the slots 34, and the nuts 38 are screwed down to push or force the tire firmly into the well.

It will be noted that the casing 8, when the tire is secured in position in the well, is itself supported and secured in position at four separated points. The casing 8 will not only hold the tire firmly down into the well but will also effectively prevent any substantial lateral or wabbling movement thereof.

If desired, the casing 8 may be locked in tire holding position to prevent the removal of the tire by an unauthorized person. To this end, in the construction shown, each of the wings of the nuts 38 is provided with openings 40 through which may be passed the bow of a padlock 41, as shown particularly in Figs. 2 and 5.

The casing 8, shown in Fig. 6, differs from that shown in Figs. 1 to 5 inclusive in that it comprises merely a side wall 42 for covering one side of a tire and a peripheral wall 44 formed to extend about the peripheral portion of the tire. This casing is adapted to be secured to the fender in substantially the same manner as the casing shown in Figs. 1 to 5 inclusive and to operate in the same manner in holding the tire in position.

In the construction shown in Figs. 7 and 8, the tire cover and holding or "push-down" devices comprise a side cover section 48 for covering one side of the tire and a peripheral section 46 arranged to extend about the peripheral portion of the tire. The side cover section 48 consists of an annular plate of relatively stiff sheet material, preferably sheet metal, constructed to extend from that part of the side wall of the tire adjacent the tread to the rim. This section is recessed or concave on the inside thereof to receive the bulge in the side wall of the tire, the section fitting over the side wall, as shown in Fig. 8. The section 48 may be formed to extend from the periphery of the tire to the axis of the tire and rim. This section is preferably constructed so as to extend for a short distance into the tire well, as indicated in dotted lines in Fig. 7. The section 46 consists of an annular member also made of relatively stiff sheet material, preferably sheet metal, and is recessed or concave on the inside thereof to receive the tread portion of the tire. The section 46 is constructed to extend beyond the tread at both side margins and is arranged to overlap the periphery of the side section 48 on the outside thereof to hold the side section in place on the tire.

The annular section 46 is constructed to extend partially about the tire but preferably does not extend down into the tire well and is preferably made of resilient material sufficiently flexible to enable the same to be expanded in applying the same to and removing it from a tire. The resilience of the section 46 will cause the same to contract upon the tire into substantially the position shown in Fig. 7 when it is released. This member also may be constructed so that the distance between the ends thereof is somewhat less than the diameter of the tire to which it is to be applied. This section, as shown in the drawings, is pivoted to the fender and is secured to the fender to hold the tire in position by means of devices having substantially the same construction, arrangement and mode of operation as the devices for pivoting the casing 8 shown in Figs. 1 to 5 inclusive to the fender and for securing said casing in position. As shown in Figs. 7 and 8, the section 46 is pivoted at 50 to the fender by means of pivot bolts passing through brackets 52 secured to one end of said section and through brackets 54 secured to the fender. The opposite end of the section 46 is secured in position to hold the tire cover in place by means of a shackle 56 pivoted in brackets 58 secured to the fender, the arms of the shackle being arranged to engage in slots in brackets 60 secured to the section 46. The end of the section is drawn down toward the fender by means of wing nuts 62 threaded on the arms of the shackle 56 and arranged to engage the brackets 60. The wing nuts may be locked on the shackle by means of a padlock 64, the bow of which passes through holes in the wings of the wing nuts.

Figs. 7 and 8 show the tire cover and the "hold-down" device applied to a tire in position to hold the tire securely in the fender well. In removing a tire from the well the nuts 62 are unscrewed, and the shackle 56 is then swung to the right to disengage the arms thereof from the slots in the brackets 60. The section 46 is then expanded and swung upwardly and to the left about its pivotal axis. The tire with the side cover section 48 may then be removed from the fender well. In placing a tire in the fender well and securing the same in position, the section 46 is swung back to its upper left end limiting position, the side cover is applied to the side wall of a tire in substantially the position shown in Figs. 7 and 8, and the tire with the side cover is inserted in the running board well. The section 46 is then swung downwardly and to the right and is expanded so that it will pass over the peripheral portion of the tire, (the swinging movement being continued until the section engages the peripheral lower tread portion of the tire.) The shackle 56 is then swung upwardly and to the left to engage the arms thereof in the slots in the brackets 60, and the nuts 62 are screwed down to force the tire firmly and securely into the fender well.

Figs. 9 and 10 show a tire cover and "hold-down" device comprising an annular cover 65 formed to extend about the peripheral portion of the tire. This cover 65 has substantially the same construction, arrangement and mode of operation as the section 46 of the cover and "holddown" device shown in Figs. 7 and 8. In the construction shown in Figs. 9 and 10 no side cover is provided for covering the outer side wall of the tire, this side wall being left exposed, as shown clearly in Fig. 9. As shown in these figures, the annular cover 65 is pivoted at 66 to the fender upon pivot bolts passing through brackets 68 secured to one end of said cover and through brackets 70 secured to the fender. The devices for securing the opposite end of the cover to the fender comprise a shackle 72 pivoted in brackets 74 secured to the fender, the arms of which shackle engage in slots in brackets 76 secured to the adjacent end of the cover 65. Wing nuts 78 are threaded on the arms of the shackle and are arranged to engage the brackets 76 to force the adjacent end of the cover toward the running board to secure the tire firmly in position.

If it is desired, the casing 8 shown in Figs. 1 to 5 inclusive may be secured to the fender so that it may be detached and entirely removed therefrom. As shown in Figure 11, the left hand end of the casing 8 may be detachably connected to the fender by substituting for the pivot bolts 18 and 20 a single pivot bolt 19 passing through the projections on the bracket 16 and on the brackets 26 and 28 and arranging this pivot bolt so that it may be withdrawn when desired. The section 46 of the construction shown in Figs. 7 and 8 and the cover 65 in the construction shown in Figs. 9 and 10 may be connected to the fender in a manner similar to that shown in Figure 11 to enable these elements to be detached.

The constructions shown in the drawings not only form satisfactory and efficient covers and "push-down" or "hold-down" devices for inflated tires, but will operate much more effectively than prior devices in holding deflated tires in position on a fender. These prior "push-down" devices, which engage either the outer periphery or the inner periphery of the tire, extend over a comparatively small area of the tire so that the tire does not furnish any great resistance to the pressure but readily collapses at this area. In the present construction the pressure of the "push-down" devices is exerted over an area extending at least substantially half way about the tire, and this area will furnish a heavy resistance to the pressure and will not collapse.

In each of these cover and "hold-down" constructions the tire is not only held firmly in the fender well so that it will not be dislodged by a movement of the tire in the general direction of the plane thereof, but the tire is effectively held from lateral movement or vibration.

The construction in each case is highly ornamental and attractive in appearance and forms an effective covering for the tire to protect the same from deterioration from exposure to the weather and from injury from accidental contacts.

It is obvious that the tire cover and "holddown" device shown in the present application is as well applicable to a tire supported on a running board as to a tire supported on a fender as shown in this case. It is therefore to be understood that the term "fender" employed in the claims is not restrictive but that this term also applies to a running board structure.

It is to be understood that the terms "annular", "ring" and "ring-shaped", and similar terms which may be employed in the specification and claims of the present application to describe the shape of the tire cover members are not limited to a construction in which the member, or the part thereof described, forms a complete ring and that these terms apply to a construction in which the said member, or the part thereof described, has the form of a portion only of a ring.

It is to be understood that the invention is not limited to the particular constructions and arrangement of parts of the illustrated embodiment of the invention, but that the invention may be embodied in other forms within the scope of the claims.

Having explained the nature and object of the invention and having specifically described a construction embodying the invention in its preferred form, what is claimed is:

1. The combination with a fender well having a spare tire therein of a push-down cover for cooperation with the open side of the fender well to substantially cover the exposed outer side wall and tread portions of the tire and including a flexible tread-covering rim portion for hugging under the tire substantially beyond an upper half of the tire tread to retain the cover on the tire and also including an extended side wall covering portion for telescoping the well to aid in holding the cover in proper tire protecting position, and adjustable means on the cover and fender for forcing the cover down on the tire to cause it to snugly fit the tire and to adjust it to slight variations in size and diameter of the tire.

2. The combination with a fender well having a spare tire therein of a push-down cover made of relatively rigid resilient material such as metal telescoping said fender well to cover the exposed outer side wall and tread portions of the tire and to hold the cover in position in the well, said cover including a discontinuous and open bottom tread covering part, the opening in the bottom of the tread covering part being of a size to permit downward application of the cover to the tire by a movement of the cover in the plane of the tire, and means connecting the end portions of the tread covering part for forcing the cover down on the tire to cause it to snugly fit the tire and to adjust it to slight variations in size and diameter of the tire, the end portions of said tread covering part being adapted to be spread apart as the cover is forced down on the tire and adapted thereafter to contract and hug the tire tread substantially below the upper half of the tire.

3. The combination with a fender well having a spare tire therein of a push-down cover made of relatively rigid resilient material such as metal for cooperation with the open side of the fender well to substantially cover the exposed outer side wall and tread portions of the tire and including a discontinuous flexible tread covering rim portion for hugging under the tire substantially beyond the upper half of the tire tread to retain the cover on the tire, the opening in the bottom of the rim portion being of a size to permit the downward application of the cover to the tire by a movement of the cover in the plane of the tire, and means connecting the ends of the tread covering rim portion for forcing the cover down on the tire to cause it to snugly fit the tire and to adjust it to slight variations in size and diameter of the tire, said means being adjustably connected to an end of said rim portion for flexing said end inwardly toward the other end of said portion to cause said ends to hug under the tire tread substantially below the upper half of the tire.

4. In combination in a vehicle, a spare tire well, a spare tire disposed therein, a tire cover for disposition over a portion of the tire above the well and having a lower portion telescoping inside the well to align the cover with the well, and means for forcing the cover downwardly into telescoping cooperation with the well and into a cushioned fit with said spare tire.

5. In combination in a vehicle, a spare wheel assembly including a spare tire well and a spare tire disposed therein, a tire cover for disposition over a portion of the tire above the well and having its lower end formed to nest inside the mouth of the well to align the cover with the well, and means for forcing the tire downwardly into cushioned cooperation with said spare wheel assembly and to hold said cover in vertical alignment with the well with its lower part nested in the mouth of the well.

GEORGE ALBERT LYON.